United States Patent
Aggarwal et al.

(10) Patent No.: US 11,556,309 B2
(45) Date of Patent: Jan. 17, 2023

(54) VIRTUAL ASSISTANT CONFIGURED TO AUTOMATICALLY CUSTOMIZE GROUPS OF ACTIONS

(71) Applicant: GOOGLE LLC, Mountain View, CA (US)

(72) Inventors: Vikram Aggarwal, Palo Alto, CA (US); Michael Andrew Goodman, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/549,478

(22) Filed: Dec. 13, 2021

(65) Prior Publication Data

US 2022/0100465 A1    Mar. 31, 2022

Related U.S. Application Data

(63) Continuation of application No. 15/709,157, filed on Sep. 19, 2017, now Pat. No. 11,200,027.

(51) Int. Cl.
*G06F 3/16* (2006.01)
*G06F 9/451* (2018.01)
*G06Q 10/10* (2012.01)

(52) U.S. Cl.
CPC .............. *G06F 3/167* (2013.01); *G06F 9/453* (2018.02); *G06Q 10/10* (2013.01)

(58) Field of Classification Search
CPC .......... G06F 3/167; G06F 9/453; G06Q 10/10
See application file for complete search history.

(56) References Cited

U.S. PATENT DOCUMENTS

| 6,466,654 B1 * | 10/2002 | Cooper | ................... | G10L 15/26 |
| | | | | 379/88.16 |
| 7,415,100 B2 * | 8/2008 | Cooper | ................... | G10L 13/00 |
| | | | | 704/E15.045 |
| 11,200,027 B2 | 12/2021 | Aggarwal et al. | | |

(Continued)

OTHER PUBLICATIONS

Korean Patent Office; Notice of Allowance issued in Application No. KR10-2019-7035907; 3 pages; dated Mar. 22, 2022.

(Continued)

*Primary Examiner* — Tadesse Hailu
(74) *Attorney, Agent, or Firm* — Gray Ice Higdon

(57) ABSTRACT

A method includes determining, by an assistant executing at one or more processors, a default group of actions that the assistant is configured to execute in response to receiving a particular audible command. The method includes determining, by the assistant, based on the default group of actions and a user profile associated with a particular user, a custom group of actions that the assistant is configured to execute in response to receiving the particular audible command from the particular user. The method also includes receiving, by the assistant, an indication of the particular audible command, and determining, by the assistant, whether the indication of particular audible command originated from the particular user. The method further includes, responsive to determining that the indication of particular audible command originated from the particular user, executing, by the assistant, each action from the custom group of actions.

19 Claims, 4 Drawing Sheets

(56) References Cited

U.S. PATENT DOCUMENTS

| | | | |
|---|---|---|---|
| 2014/0244712 A1* | 8/2014 | Walters | G06Q 30/02 709/202 |
| 2014/0249817 A1 | 9/2014 | Hart et al. | |
| 2014/0317502 A1 | 10/2014 | Brown et al. | |
| 2015/0154976 A1 | 6/2015 | Mutagi | |
| 2015/0213355 A1 | 7/2015 | Sharma et al. | |
| 2015/0215350 A1* | 7/2015 | Slayton | G06F 9/453 709/204 |
| 2016/0132030 A1 | 5/2016 | Marti et al. | |
| 2016/0155442 A1 | 6/2016 | Kannan et al. | |
| 2016/0165038 A1 | 6/2016 | Lim et al. | |
| 2017/0017501 A1 | 1/2017 | Quast | |
| 2017/0169819 A1 | 6/2017 | Mese et al. | |
| 2017/0242657 A1 | 8/2017 | Jarvis et al. | |
| 2017/0263249 A1 | 9/2017 | Akbacak et al. | |
| 2017/0286785 A1 | 10/2017 | Schaffer et al. | |
| 2018/0108343 A1 | 4/2018 | Stevans et al. | |
| 2018/0293484 A1* | 10/2018 | Wang | G06F 16/632 |
| 2018/0332169 A1 | 11/2018 | Somech et al. | |

OTHER PUBLICATIONS

Korean Patent Office; Notice of Office Action issued in Application No. 10-2019-7035907; 8 pages; dated Mar. 10, 2021.

Intellectual Property India; Office Action issued in Application No. 201927048684; 7 pages; dated Mar. 4, 2021.

European Patent Office; Summons to Attend Oral Proceedings Pursuant to Rule 115(1) EPC issued for Application No. 18793057.3 dated Jul. 7, 2020.

European Patent Office; Examination Report issued in U.S. Appl. No. 18/793,057 dated Feb. 4, 2020.

European Patent Office; Examination Report issued in Application No. 18793057.3 dated Aug. 28, 2019.

Tedford, D., "How to use your Amazon Echo to listen to local news from The Orange County Register;" https://www.ocregister.com/2017/05/01/how-to-use-your-amazon-echo-to-listen-to-local-news-from-the-orange-county-register/, 1 page; May 1, 2017.

Grantham, Y., "Guest Post: How To Speak Alexa;" https:///web.archive.org/web/20150707013535/https://lovemyecho.com/2015/07/06/guest-post-how-to-speak-alexa/, 8 pages, 2015.

Griffith, E., "The Best Amazon Alexa Skills;" https://uk.pcmag.com/features/88525/the-best-amazon-alexa-skills; 41 pages; Mar. 24, 2017.

Martin, T., "How to customize your Alexa speaker's Flash Briefing;" https://www.cnet.com/how-to/amazon-echo-how-to-customize-your-flashing-briefing/, 5 pages; Sep. 29, 2016.

European Patent Office; International Search Report and Written Opinion of PCT Ser. No. PCT/US2018/051631; 13 pages; dated Dec. 19, 2018.

European Patent Office; Communication issued in Application No. 21169215.7; 8 pages; dated Nov. 26, 2021.

* cited by examiner

VIRTUAL ASSISTANT CONFIGURED TO AUTOMATICALLY CUSTOMIZE GROUPS OF ACTIONS

BACKGROUND

Some computing platforms may provide a user interface from which a user can chat, speak, or otherwise communicate with a virtual, intelligent, or computational assistant (e.g., also referred to simply as an "assistant") to cause the assistant to output information, respond to a user's needs, or otherwise perform certain operations to help the user perform an action. For instance, a computing device may receive, with a microphone, voice input (e.g., audio data) that corresponds to a user utterance. An assistant executing, at least in part, at the computing device may analyze the voice input and may perform an action based on the utterance. The assistant may perform a single action based on the utterance. The assistant may perform the same action based on the utterance for all users of the assistant.

SUMMARY

The disclosed subject matter relates to techniques for enabling an assistant to automatically customize groups of actions to individual users. The assistant determines a customized group of actions to perform when the assistant receives a particular command from a particular user, and the assistant determines different, customized or default groups of actions to perform in response to receiving the same particular command from other users. The assistant customizes groups of actions to be more relevant to individual users, for example, based on an individual's user profile, historical behavior, past interactions with the assistant, contextual information, and other information associated with the individual user. In this way, the assistant is configured to automatically determine groups of actions that are particularly relevant to an individual user and execute only those particularly relevant actions in response to receiving a command from that individual user. Accordingly, the described techniques may reduce processing power that would otherwise be consumed while executing seemingly irrelevant or undesirable actions that may only be helpful or of interest to other users. In addition, by automatically creating customized groups of actions, the assistant may require fewer user inputs to create groups of actions associated with command, which may further decrease the power consumed by the computing device and improve the user experience. Further, in some examples, the assistant may execute a plurality of actions in parallel, thus increasing the speed at which the actions are executed.

Further to the descriptions below, a user may be provided with controls allowing the user to make an election as to both if and when assistants, computing devices, or computing systems described herein can collect or make use of personal information, and if and when the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In one example, the disclosure is directed to a method that includes determining, by an assistant executing at one or more processors, a default group of actions that the assistant is configured to execute in response to receiving a particular audible command. The method includes determining, by the assistant, based on the default group of actions and a user profile associated with a particular user, a custom group of actions that the assistant is configured to execute in response to receiving the particular audible command from the particular user. The method also includes receiving, by the assistant, an indication of the particular audible command. The method further includes, determining, by the assistant, whether the indication of particular audible command originated from the particular user; and responsive to determining that the indication of particular audible command originated from the particular user, executing, by the assistant, each action from the custom group of actions.

In another example, the disclosure is directed to a computing device that includes: an output device, at least one processor, and at least one memory. The memory includes instructions that when executed, cause the at least one processor to execute an assistant configured to determine a default group of actions that the assistant is configured to execute in response to receiving a particular audible command; determine, based on the default group of actions and a user profile associated with a particular user, a custom group of actions that the assistant is configured to execute in response to receiving the particular audible command from the particular user; receive, an indication of the particular audible command; determine, whether the indication of particular audible command originated from the particular user; and responsive to determining that the indication of particular audible command originated from the particular user, execute each action from the custom group of actions.

In another example, the disclosure is directed to a computer-readable storage medium comprising instructions that, when executed cause at least one processor of a digital assistant system to: determine a default group of actions that the assistant is configured to execute in response to receiving a particular audible command; determine, based on the default group of actions and a user profile associated with a particular user, a custom group of actions that the assistant is configured to execute in response to receiving the particular audible command from the particular user; receive an indication of the particular audible command; determine whether the indication of particular audible command originated from the particular user; and responsive to determining that the indication of particular audible command originated from the particular user, execute each action from the custom group of actions.

In another example, the disclosure is directed to a system including means for determining a default group of actions that the assistant is configured to execute in response to receiving a particular audible command; determining, based on the default group of actions and a user profile associated with a particular user, a custom group of actions that the assistant is configured to execute in response to receiving the particular audible command from the particular user; receiving an indication of the particular audible command; determining whether the indication of particular audible command originated from the particular user; and responsive to determining that the indication of particular audible command originated from the particular user, executing each action from the custom group of actions.

The details of one or more examples are set forth in the accompanying drawings and the description below. Other features, objects, and advantages of the disclosure will be apparent from the description and drawings, and from the claims.

DETAILED DESCRIPTION

Figure 1:
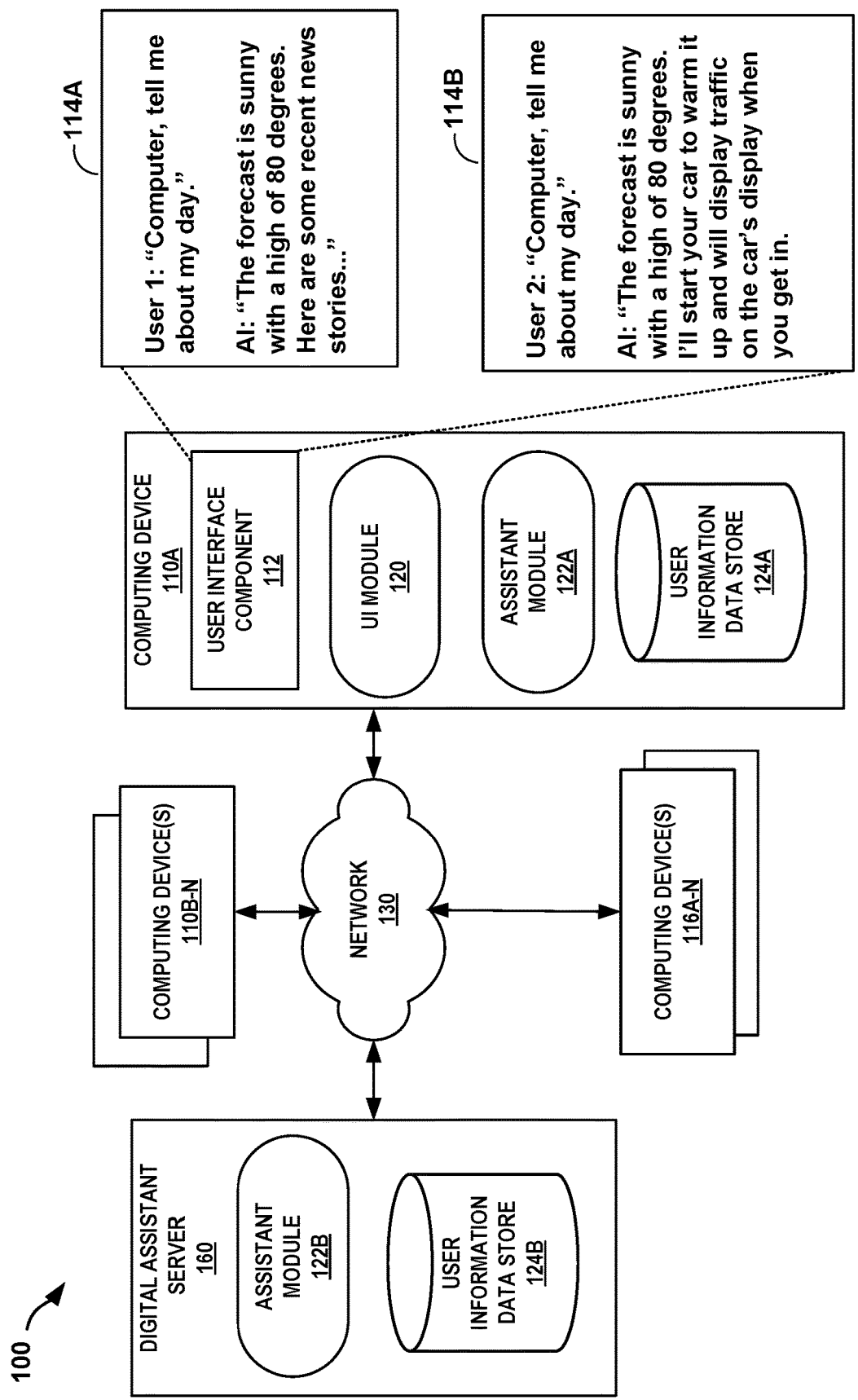
FIG. 1 is a conceptual diagram illustrating an example system that executes an example virtual assistant, in accordance with one or more aspects of the present disclosure.

FIG. 1 is a conceptual diagram illustrating an example system that executes an example virtual assistant, in accordance with one or more aspects of the present disclosure. System 100 of FIG. 1 includes digital assistant server 160 in communication, via network 130, with computing devices 110A-110N (collectively, "computing devices 110") and computing devices 116A-116N (collectively, "computing devices 116"). Although system 100 is shown as being distributed amongst digital assistant server 160, and computing devices 110, 116, in other examples, the features and techniques attributed to system 100 may be performed internally, by local components of computing devices 110, 116. Similarly, digital assistant server 160 may include certain components and perform various techniques that are otherwise attributed in the below description to computing devices 110, 116.

Network 130 represents any public or private communications network, for instance, cellular, Wi-Fi®, and/or other types of networks, for transmitting data between computing systems, servers, and computing devices. Digital assistant server 160 may exchange data, via network 130, with computing devices 110, 116 to provide a virtual assistant service that is accessible to computing devices 110, 116 when computing devices 110, 116 are connected to network 130.

Network 130 may include one or more network hubs, network switches, network routers, or any other network equipment, that are operatively inter-coupled thereby providing for the exchange of information between server system 160 and computing devices 110, 116. Computing devices 110, 116, and digital assistant server 160 may transmit and receive data across network 130 using any suitable communication techniques. Computing devices 110, 116, and digital assistant server 160 may each be operatively coupled to network 130 using respective network links. The links coupling computing devices 110, 116, and digital assistant server 160 to network 130 may be Ethernet or other types of network connections and such connections may be wireless and/or wired connections.

Digital assistant server 160 represents any type of computing device that is configured to execute an assistant and communicate on a network. Examples of digital assistant server 160 include cloud computing environments, desktop computers, laptop computers, servers, mobile phones, tablet computers, wearable computing devices, countertop computing devices, home automation computing devices, televisions, stereos, automobiles, or any other type of mobile or non-mobile computing device that is configured to execute a virtual assistant service.

Computing devices 110 represent individual mobile or non-mobile computing devices that are associated with a particular user or user profile, and are configured to access the virtual assistant service provided via network 130. In some instances, by being associated with a particular user, one or more of computing devices 110 may be connected to a particular network that is associated with or frequently accessed by the particular user. For instance, a subset of computing devices 110 may be located in a user's home and may communicate via a home network. In contrast to computing devices 110, computing devices 116 represent individual mobile or non-mobile computing devices that are associated with other users or other user profiles (e.g., users other than the particular users associated with computing devices 110) and configured to access the virtual assistant service provided via network 130. In other words, computing devices 110 are associated with a particular user in the example of FIG. 1, whereas computing devices 116 are associated with other users, and not associated with the particular user associated with computing devices 110.

Examples of computing devices 110, 116 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a home appliance (e.g., a coffee maker, refrigerator, etc.), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device. Other examples of computing devices 110, 116 may exist beyond those listed above. Computing devices 110, 116 may be any device, component, or processor, configured to access the virtual assistant service provided via network 130

In the example of FIG. 1, digital assistant server 160 includes assistant module 122B and user information data store 124B. Computing device 110A includes user interface component (UIC) 112, user interface (UI) module 120, assistant module 122, and user information data store 124A. Although not shown, computing devices 110B-110N and/or computing devices 116 may include similar components and/or modules as computing device 110A.

Modules 120, 122A, and 122B may perform operations described using software, hardware, firmware, or a mixture of hardware, software, and firmware residing in and/or executing at one of computing device 110A or digital assistant server 160. Computing device 110A and digital assistant server 160 may execute modules 120, 122A, and 122B with multiple processors or multiple devices. Computing device 110A and digital assistant server 160 may execute modules 120, 122A, and 122B as virtual machines executing on underlying hardware. Modules 120, 122A, and 122B may execute as one or more services of an operating system or computing platform. Modules 120, 122A, and 122B may execute as one or more executable programs at an application layer of an operating system or computing platform.

UIC 112 of computing devices 110 may function as an input and/or output device for computing device 110A. UIC 112 may be implemented using various technologies. For instance, UIC 112 may function as an input device using presence-sensitive input screens, microphone technologies, infrared sensor technologies, cameras, or other input device technology for use in receiving user input. UIC 112 may function as output device configured to present output to a user using any one or more display devices, speaker technologies, haptic feedback technologies, or other output device technology for use in outputting information to a user.

UI module 120 may manage user interactions with UIC 112 and other components of computing device 110A and may interact with digital assistant server 160 so as to provide assistant services via UIC 112. UI module 120 may cause UIC 112 to output a user interface as a user of computing device 110A views output and/or provides input at UIC 112. For example, as shown in FIG. 1, UI module 120 may send instructions to UIC 112 that cause UIC 112 to display user interface 114A or 114B (collectively, user interfaces 114) at a display screen of UIC 112.

User interfaces 114 include text of conversations between individual users of computing device 110A and an assistant provided by assistant module 122A. In the example of FIG. 1, user interfaces 114 are primarily graphical user interfaces, however, user interfaces 114 may in some examples be primarily audible, haptic, or a combination of graphical, audible, or haptic type user interfaces. In other words, user interfaces 114 may include virtual assistant information in various forms such as audible sounds, voice notifications, vibrations, text, graphics, content cards, images, etc.

UI module 120 and UIC 112 may receive one or more indications of input (e.g., voice input, touch input, non-touch or presence-sensitive input, video input, audio input, etc.) from a user as the user interacts with a user interface of user interfaces 114, at different times and when the user and computing device 110A are at different locations. UI module 120 and UIC 112 may interpret inputs detected at UIC 112 and may relay information about the inputs detected at UIC 112 to assistant module 122A and/or one or more other associated platforms, operating systems, applications, and/or services executing at computing device 110A, for example, to cause computing device 110A to perform actions.

UI module 120 may receive information and instructions from one or more associated platforms, operating systems, applications, and/or services executing at computing device 110A and/or one or more remote computing systems, such as server system 160. In addition, UI module 120 may act as an intermediary between the one or more associated platforms, operating systems, applications, and/or services executing at computing device 110A, and various output devices of computing device 110A (e.g., speakers, LED indicators, audio or haptic output device, etc.) to produce output (e.g., a graphic, a flash of light, a sound, a haptic response, etc.) with computing device 110A. For example, UI module 120 may cause UIC 112 to output user interfaces 114 based on data UI module 120 receives via network 130 from digital assistant server 160. UI module 120 may receive, as input from digital assistant server 160 and/or assistant module 122A, information (e.g., audio data, text data, image data, etc.) and instructions for presenting as user interfaces 114.

Assistant module 122A and assistant module 122B may collaboratively maintain user information data stores 124A and 124B as part of a virtual assistant service accessed via computing devices 110. Assistant module 122B and user information data store 124B represent server-side or cloud implementations of an example assistant whereas assistant module 122A and user information data store 124A represent a client-side or local implementation of the example assistant. In some examples, some or all the functionality attributed to assistant module 122A may be performed by assistant module 122B, and vice versa.

Referred to collectively as assistant modules 122, assistant module 122A and assistant module 122B may each include software agents configured to execute as intelligent personal assistants that can perform actions or services for an individual, such as a user of computing devices 110. Assistant modules 122 may perform these actions or services based on user input (e.g., detected at UIC 112), context awareness (e.g., based on location, etc.), and/or an ability to access other information (e.g., weather or traffic conditions, news, stock prices, sports scores, user schedules, transportation schedules, retail prices, etc.) from a variety of information sources (e.g., either stored locally at computing devices 110, digital assistant server 160, or obtained via a search or other information retrieval service). Assistant modules 122 may rely on other applications (e.g., third-party applications), services, or other devices (e.g., televisions, automobiles, watches, home automation systems, entertainment systems, etc.) to perform actions or services for an individual.

After receiving explicit user consent, assistant modules 122 may automatically maintain information associated with a user, or pointers to locations of information associated with a user (e.g., stored by information sources located at computing devices 110, server system 160, or by any other server or device located elsewhere on network 130). Assistant modules 122 may maintain the information, or pointers to information, associated with the user as user information data stores 124A and 124B (collectively "user information data stores 124"). Data stores 124 may enable the assistant executed by assistant modules 122 to quickly access user information required by the assistant to complete a real-world action, a virtual action, or otherwise respond to immediate and/or future needs of the user of computing devices 110. Assistant modules 122 may permit a user to revoke access to and/or delete copies of information associated with the user.

Data stores 124 may include one or more user profiles that are each associated with a respective user of computing devices 110, 116. For example, a user profile may include information obtained, with permission from the user, during a conversation or interaction between the user and the assistant, calendar information, contact information, user interests, user preferences, and any other information associated with a user that may be used by assistant modules 122. Examples of sources of information for a user profile may include, but are not limited to, intelligence built in an e-mail system, user interactions with assistant modules 122, user interactions and application usage on devices associated with the user (e.g., computing devices 110), or other sources of information.

In accordance with techniques of this disclosure, assistant modules 122 may provide an assistant that executes at, or is accessible from, computing devices 110. In general, assistant modules 122 may be configured to execute one or more routines that each include a plurality of actions and may customize the routine for different user profiles. In other words, as used herein, the term "routine" generally refers to a group of actions performed by assistant modules 122 together (e.g., in parallel or serially) at approximately the same time. As used throughout this disclosure, at approximately the same time means within a threshold or predetermined amount of time, such as one second, thirty seconds, one minute, five minutes, etc. (e.g., as opposed to an exact instant in time).

Assistant modules 122 may be configured to execute a particular routine in response to receiving a particular command from a particular user (e.g., "Computer, I'm off to work") and may execute a different routine in response to receive a different command from the particular user (e.g., "Computer, I'm headed home"). In other words, different commands may correspond to different routines. In some instances, a particular routine may be associated with multiple commands. For instance, a morning routine may be associated with the command "Hey computer, I'm awake" or the command "Computer, let's get the day started." In some examples, each routine includes a plurality of actions executable by assistant modules 122. Hence, in some examples, one or more assistant modules 122 are configured to execute a plurality of actions in response to receiving a particular command (e.g., an audible command).

In some examples, assistant modules 122 determine a default group of actions that assistant modules 122 are configured to execute in response to receiving the particular command. In other words, assistant modules 122 determine a default group of actions that are included in a routine associated with the particular command. Assistant modules 122 may determine the default group of actions by retrieving a pre-programmed group of actions from a memory device. The default group of actions may be programmed at a factory or may be received as part of a software update from an application developer. In some instances, the default group of actions are initially associated with all users of computing devices 110 and 116.

Assistant modules 122 may determine the default group of actions using machine learning. For example, assistant modules 122 determine, in some instances, a default group of actions by analyzing what actions users of computing devices 110, 116 cause assistant modules 122 to perform together and in different circumstances. The actions that appear most frequently across different scenarios or contexts may form a default group of actions that assistant module 122 determines is generally applicable to all users of computing devices 110, 116.

Assistant modules 122 may generate the default group of actions associated with a command by utilizing machine learning to analyze individual user and/or device information stored in user information data stores 124. Assistant modules 122 may only analyze information associated with computing devices 110, 116 and/or users of computing devices 110, 116 if the users affirmatively consent to use or collection of such information. Assistant modules 122 may further provide opportunities for individual users to withdraw consent and in which case, assistant modules 122 may cease collecting or otherwise retaining the information associated with the individual user or computing devices associated with the individual user. User profiles within data stores 124 may include user interaction data indicating how often users of computing devices 110 and/or 116 utilize certain applications and/or application features, request certain types of information (e.g., weather, traffic), or otherwise interact with computing devices 110, 116 and/or assistant modules 122.

Assistant modules 122 may identify actions that users of computing devices 110, 116 frequently perform, actions that users of computing devices 110, 116 frequently utilize computing devices 110, 116 to perform, or both. For instance, assistant module 122B may determine, based at least in part on past user interaction data (also referred to as action usage data) stored in data stores 124, that users of computing devices 110, 116 often request news and weather information from computing devices 110, 116 in the morning. Thus, in some examples, assistant modules 122 determines the default group of actions for a morning routine include outputting the news and weather information. Thus, assistant modules 122 may determine that the default group of actions corresponding to a particular command (e.g., a command associated with a morning routine, such as "Good morning computer" or "Computer, let's get the day started") include outputting the news and weather information.

In some examples, assistant modules 122 determines a custom group of actions that assistant modules 122 are configured to execute as part of a routine. Assistant modules 122 may determine the custom group of actions based on the default group of actions and a user profile associated with a particular user of computing devices 110. As described above, information associated with a user profile may be stored in one or more of data stores 124. In some examples, assistant modules 122 may determine (e.g., based on user information for the user profile associated with a particular user) whether one or more actions from the default group of actions associated with a particular command are relevant to the user associated with the particular user profile. For instance, data stores 124 may include a user profile for a particular user that includes user interaction data indicating how much the user causes computing devices 110 to perform a particular action. The user interaction data may indicate that the particular user rarely (e.g., once a month) requests news information in the morning, such that assistant modules 122 may determine that news information is not relevant to that particular user. Thus, in some scenarios, assistant modules 122 generates a custom group of activities for the particular user that does not include the news information.

Assistant modules 122 may determine the custom group of actions associated with a particular command includes an action that is not included in the default group of actions. For example, assistant modules 122 may determine, based on user interaction data within a user profile that is stored in data stores 124, that the particular user requests traffic information every day at approximately the same time (e.g., within a threshold amount of time of a certain time). Assistant modules 122 may add an action to a custom group of actions based on the user information associated with the particular user. For example, assistant modules 122 may update the custom group of actions to include starting the user's vehicle and outputting traffic information.

In some examples, assistant modules 122 are configured to execute a group of actions in response to receiving a particular command. For example, assistant modules 122 may receive an indication of user input (e.g., a gesture, audible command, etc.), determine whether the user input corresponds to a particular command, and execute a group of actions (e.g., a group of actions associated with a particular routine) in response to determining that the user input corresponds to the particular command. For example, UIC 112 may detect a gesture at a presence-sensitive display and may send an indication of the gesture to assistant modules 122. Assistant modules 122 may determine whether the gesture corresponds to a particular command. As another example, UIC 112 may detect audio data (e.g. a spoken audio command) and may send an indication of the audio data to assistant modules 122. Assistant modules 122 may determine whether the audio data includes a particular audio command (e.g., by performing speech recognition techniques on the audio data). In some examples, assistant modules 122 are configured to execute a group of actions in response to determining that the audio data includes the particular command.

In some scenarios, assistant modules 122 receives an indication of a command and determines whether the command originated from a particular user. For instance, assistant modules 122 may receive an indication of an audible command "Computer, tell me about my day." Responsive to receiving the indication of the command, assistant modules 122 determine whether the command originated from a particular user. Assistant modules 122 may determine whether the command originated from the particular user based on biometrics (e.g., voice, face, or handwriting recognition). For example, user information data store 124A may include a voice fingerprint for the particular user and may compare the indication of the audible command to the voice fingerprint to determine whether an audible command was spoken by the particular user. For instance, assistant module 122A may determine that the audible command was spoken by the particular user in response to determining that the spoken command corresponds to the voice fingerprint for the particular user. In some examples, computing device 110A may capture one or more images prior to, during, and/or after receiving a command and assistant module 122A may determine whether a command originated from the particular user based on the one or more images. For instance, assistant module 122A may perform facial recognition on at least one captured image and may determine that the command originated from the particular user in response to determining that at least one captured image includes an image of the particular user.

In some examples, assistant modules 122 determine that the command did not originate from the particular user. For instance, computing device 110 may be located at the user's home, may receive the audible command "Hey computer, tell me about my day," and may determine (e.g., based on voice recognition) that the particular user did not speak the command. Responsive to determining that the command did not originate from the particular user, assistant modules 122 may execute one or more actions from the default group of actions. For instance, as illustrated by user interface 114A, when the default group of actions includes outputting news and weather information, assistant modules 122 may cause one or more of computing devices 110 to output the news and weather information.

Responsive to determining that the command originated from the particular user, assistant modules 122 may execute one or more actions from the custom group of actions associated with the particular user. For example, when the custom group of actions includes outputting weather and traffic information, and starting the user's vehicle, assistant modules 122 may cause one or more computing devices 110 to output the weather and traffic information and start the user's vehicle. For instance, as illustrated by user interface 114B, assistant modules 122 may cause computing device 110A (e.g., a counter top home assistant, which may not have a display device) to audibly output weather information and computing device 110B (e.g., within a vehicle) to start the vehicle and output for display (e.g., via a display device within the vehicle) to display traffic information (e.g., a traffic map).

In some instances, assistant modules 122 execute one or more actions (e.g., actions in a default group of actions or a custom group of actions) at approximately the same time. For instance, assistant modules 122 may output news and weather information at approximately the same time (e.g., sequentially).

While assistant modules 122 are described as being configured to execute a group of actions (e.g., a default group of actions or a custom group of actions) in response to receiving an audible command, assistant modules 122 may be configured to execute a group of actions that are included in a routine in response to a detecting a triggering event, such as an occurrence of a scheduled event (e.g., a calendar event, an alarm, etc.), receipt of a predetermined notification, receipt of a command (e.g., gesture input, or audible input), etc. For example, when the triggering event includes an alarm set to occur at a scheduled time, assistant modules 122 may execute a group of actions associated with a particular routine in response to the alarm occurring. As another example, when the triggering event includes receiving a notification that a door (e.g., a garage door) has opened (e.g., upon a user returning home after work) or closed (e.g., upon a user leaving for work), assistant modules 122 may execute a group of actions associated with opening or closing the door. Assistant modules 122 may determine a default group of actions and a custom group of actions that assistant modules 122 are configured to execute in response to detecting the triggering event, and may execute the default or custom group of actions in response to detecting the triggering event.

In contrast to some computing devices that execute one action per command, assistant modules 122 may execute a group of actions in response to receiving a single command. In this way, assistant modules 122 may reduce the number of commands required to execute a group of actions, which may reduce processing performed by one or more computing devices. Further, by associating a group of actions with a single command, assistant modules 122 may reduce data traffic on network 130 between computing device 110A and server 160 (e.g., to perform voice recognition on spoken commands), data traffic on a communication bus (e.g., communication channel 250 of FIG. 2), calls to memory, battery usage, etc. Reducing the number of commands required to execute a group of actions may improve the user experience by making the assistant seem natural, less awkward, and more desirable to the user. By automatically customizing a group of actions for an individual user, assistant modules 122 may execute only those actions that are determined to be particularly relevant to the user, which may reduce processing performed by one or more computing devices. Further, by automatically customizing the group of actions for an individual, the assistant may require fewer user inputs to create groups of actions, which may decrease the power consumed by one or more computing devices.

Among the several benefits provided by the aforementioned approach are: (1) the processing complexity and time for a device to act may be reduced by executing a group of actions in response to a trigger rather than executing actions one at a time; (2) meaningful information and information associated with the user may be stored locally reducing the need for complex and memory-consuming transmission security protocols on the user's device for the private data; (3) because the example assistant executes groups of actions in response to a trigger, fewer specific inquiries or commands may be received from the user, thereby reducing demands on a user device for query rewriting and other computationally complex data retrieval; and (4) network usage may be reduced as a quantity of specific inquires and/or commands is reduced.

Figure 2:
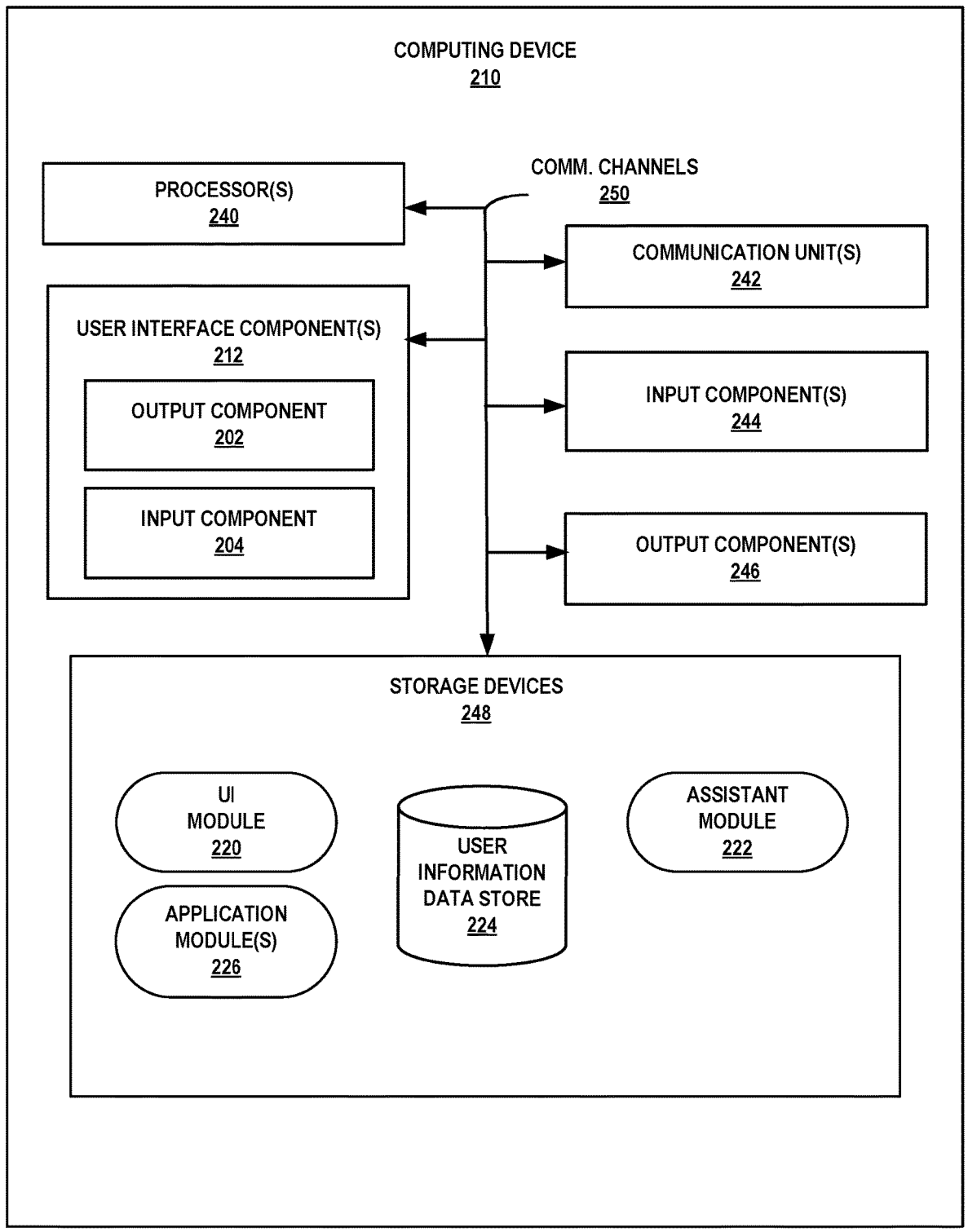
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of computing devices 110, 116 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more communication units 242, one or more input components 244, one or more output components 246, and one or more storage components 248. UIC 212 includes output component 202 and input component 204. Storage components 248 of computing device 210 include UI module 220, assistant module 222, user information data store 224, and one or more application modules 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a global positioning satellite (GPS) receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 244 may include one or more sensor components, such as one or more location sensors (e.g., GPS components), one or more temperature sensors, one or more movement sensors (e.g., accelerometers, gyros), one or more pressure sensors, and one or more other sensors (e.g., an audio sensor such as a microphone, an optical image sensor, infrared proximity sensor, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

UIC 212 of computing device 210 may be similar to UIC 112 of computing device 110 and includes output component 202 and input component 204. Output component 202 may be a display component, such as a screen at which information is displayed by UIC 212 and input component 204 may be a presence-sensitive input component that detects an object at and/or near output component 202. Output component 202 and input component 204 may be a speaker and microphone pair or any other combination of one or more input and output components, such as input components 244 and output components 246. In the example of FIG. 2, UIC 212 may present a user interface (such as user interfaces 114 of FIG. 1).

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

One or more storage components 248 within computing device 210 may store information for processing during operation of computing device 210 (e.g., computing device 210 may store data accessed by modules 220, 222, and 226, and data store 224 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, and 226, and data store 224. Storage components 248 may include a memory configured to store data or other information associated with modules 220, 222, and 226, and data store 224.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, and 226 may be operable by processors 240 to perform various actions, operations, or functions of computing device 210. For example, processors 240 of computing device 210 may retrieve and execute instructions stored by storage components 248 that cause processors 240 to perform the operations modules 220, 222, and 226. The instructions, when executed by processors 240, may cause computing device 210 to store information within storage components 248, for example, at data stores 224.

UI module 220 may include all functionality UI module 120 of FIG. 1 and may perform similar operations as UI module 120 for executing an assistant as part of computing device 210. UI module 220 may manage user interactions with UIC 212 and other components of computing device 210. UI module 220 may cause UIC 212 to output a user interface as a user of computing device 210 views output and/or provides input at UIC 212.

User information data store 224 is an example of user information data store 124A of FIG. 1. User information data store 224 may include one or more user profiles associated with respective users of computing device 210 and/or users of other computing devices (e.g., computing devices 116 of FIG. 1). In some examples, a user profile may include user information obtained with permission from the user. For example, each user profile may include information obtained during a conversation or interaction between the user and the assistant. Each user profile may include information indicative the user's interests and/or user preferences. A user profile may include user interaction data, which may indicate when and/or how much the user causes an assistant to perform certain actions. In some examples, a user profile may include biographical information associated with the user, such as a geographic location (e.g., a city, state, or country where the user resides), age of the user, occupation, etc.

Application modules 226 represent various individual applications and services that may be executed by computing device 210 and that may be accessed by an assistant to provide user with information and/or perform a task or action. Examples of application modules 226 include a fitness application, a calendar application, a search application, a map, traffic, or navigation application, a travel application (e.g., planning, reservation, ticketing, etc.), a social media application, a game application, an e-mail application, a chat or messaging application, an Internet browser application, or any other applications that may execute at computing device 210. An assistant executing at computing device 210, such as assistant module 222, may cause applications 226 to execute instructions for performing actions associated with the assistant. In other words, the assistant may rely on application modules 226 to perform one or more actions on behalf of the assistant.

Assistant module 222 may include all functionality of assistant modules 122 of FIG. 1 and may perform similar operations as assistant modules 122 for executing an assistant as part of computing device 210 and maintaining and accessing user information at user information data store 224. In some examples, assistant module 222 may execute locally (e.g., at processors 240) to provide assistant functions. In some examples, assistant module 222 may act as an interface to a remote assistant service accessible to computing device 210. For example, assistant module 222 may be an interface or application programming interface (API) to assistant module 122B of digital assistant server 160 of FIG. 1.

Assistant module 222 may be configured to execute a group of actions in response to a triggering event, such as an occurrence of a scheduled event (e.g., a calendar event, an alarm, etc.), receipt of a predetermined notification, or receipt of a command (e.g., gesture, or audible command). For example, assistant module 222 may be configured to execute a group of actions that are part of a routine associated with a particular (e.g., audible) command.

As one example, a morning routine may be associated with an audible command such as "Hey computer, let's get the day started" and the group of actions performed with the morning routine may include outputting news information and traffic information and brewing a cup of coffee. An afternoon routine may be associated with the audible command "Computer, I'm headed home" and the group of actions performed with the afternoon routine may include outputting traffic information and calendar information (e.g., for events later that evening). An evening routine may be associated with the audible command "Ok computer, what is going on tomorrow?" and the group of actions performed with the evening routine may include outputting calendar information (e.g., for the next day) and adjusting an alarm (e.g., based on an early morning meeting).

Each group of actions executed as part of a routine may be associated with one or more audible commands. The audible commands may or may not require a response from assistant module 222. For example, assistant module 222 may be configured to execute a group of actions in response to receiving an audible command that requests a response, such as "Hey computer, tell me about my day." Similarly, assistant module 222 may be configured to execute a group of actions in response to receiving an audible command that does not include a request for a response, such as "Hey computer, I'm going to work."

Assistant module 222 may be configured to execute a default group of actions associated with a particular command. In some examples, a default group of actions is associated with all users who utilize an assistant and in other examples, a default group of actions associated with a particular command may only be associated with a subset of users (e.g., users of computing devices 210, 110, and/or 116). For instance, assistant module 222 may determine a first group of default actions associated with a particular command for a first subset of users and a second group of default actions associated with the same command for a second (e.g., different than the first) subset of users.

In some examples, assistant module 222 groups users into various subsets. For example, assistant module 222 may determine a subset of users as including a type of users that are similar to one another. For example, assistant module 222 may determine that a group of users of computing devices 210, 110, and/or 116 are similar based on one or more user profiles stored in a user information data store (e.g., data store 224). For instance, assistant module 222 may determine that a group of users are similar in response to determining that user profiles associated with respective users indicate the users are from a similar geographic area (e.g., city, state, country), have similar interests, speak the same language, are within the same age group, have similar jobs, cause computing devices 210, 116 to perform similar actions, etc. For instance, assistant module 222 may determine that a first type of user includes users living in England and a second type of user includes users living in France.

Assistant module 222 may determine that different types of users are associated with different types of routines. In some examples, assistant module 222 may determine (e.g., based on information stored in user profiles) that a first type of user (e.g., a person who works outside the home) is associated with a morning routine (e.g., a group of actions performed before going to work), an afternoon routine (e.g., a group of actions performed before returning home), and an evening routine (e.g., a group of actions performed in preparation for the next day). For example, assistant module 222 may determine that the first type of user frequently causes computing device 210 or other assistant enable computing devices to perform various actions in the morning, afternoon, and evening. Similarly, assistant module 222 may determine that a second type of user (e.g., a stay-at-home parent) is associated with a morning routine, a lunch routine, a shopping routine, a play-time routine, etc. For example, assistant module 222 may determine that the second type of user frequently causes computing device 210 or other assistant enable computing devices to perform various actions in the morning, mid-morning, mid-day, mid-afternoon, and evening. Assistant module 222 may determine each routine is associated with different commands and includes actions associated with the respective commands.

In some examples, assistant module 222 determines a default group of actions associated with a particular command. The default group of actions may be associated with all users of computing devices 210, 110, 116 or may be associated with a particular type of similar users. The default group of actions associated with a particular command may include one or more actions to output information (e.g., visually or audibly for human consumption), one or more actions to perform a task, or one or more other types of actions or a combination therein. Examples of tasks include brewing a cup of coffee, turning lights on or off, opening or closing a garage door, adjusting a thermostat, recording a show, playing music, placing an order, creating or annotating an electronic list, or any other conceivable action that an assistant may perform other than outputting information via a user interface (e.g., other than outputting information for human consumption).

In some examples, assistant module 222 determines the default group of actions by querying storage devices 248 to retrieve a pre-programmed group of actions. The pre-programmed group of actions may be programmed at a factory or may be received as part of a software update from a software developer.

Assistant module 222 may determine the default group of actions associated with a particular command by utilizing a model generated by machine learning techniques. Example machine learning techniques that may be employed to generate a model can include various learning styles, such as supervised learning, unsupervised learning, and semi-supervised learning. Example types of models generated via such techniques include Bayesian models, Clustering models, decision-tree models, regularization models, regression models, instance-based models, artificial neural network models, deep learning models, dimensionality reduction models and the like.

In some examples, assistant module 222 applies the model to one or more inputs and outputs a default group of actions. After receiving explicit consent from users, assistant module 222 may apply the model to user information (e.g., from one or more user profiles stored in data store 224 and/or data stores 124) to identify actions that a user of computing device 210 is likely to cause computing device 210 to perform.

In some instances, the default group of actions include actions that appear most frequently across different scenarios or contexts. For example, assistant module 222 may apply the model to determine actions frequently performed by computing device 210, actions performed by other computing devices associated with an individual user of computing device 210, and actions performed by computing devices (e.g., computing devices 116 of FIG. 1) that are associated with other users. For instance, the model may be trained on user information indicating that 85% of users of computing devices (e.g., computing devices 210, 110, and 116) request weather information in the morning, that 80% of the users request traffic information in the morning, and that 30% of users brew a cup of coffee in the morning. Assistant module 222 may compare how often an action is performed to a threshold usage amount (e.g., 50% of users). In some examples, assistant module 222 determines that the default group of actions include actions where the usage of that action satisfies (e.g., is greater than or equal to) the threshold usage amount. Thus, in some instances, assistant module 222 may determine that a routine (e.g., a morning routine) associated with a particular command (e.g., "Hey computer, tell me about my day") includes an action to output traffic information and an action to output weather information, and may not include an action to brew a cup of coffee.

In some examples, the default group of actions includes actions that are associated with one another. Two or more actions may be associated with one another when users perform and/or cause computing devices to perform the two or more actions at approximately the same time. Assistant module 222 may determine that two or more actions are associated with one another and are part of a default group of actions in response to determining that a threshold amount of individual users (e.g., a threshold amount of all users or a threshold amount of a particular subset of similar users) cause computing devices associated with each of the respective users to perform the two or more actions at approximately the same time (e.g., within a threshold window of time of requesting weather information). In other words, assistant module 222 may determine that two or more actions are associated with one another when a threshold amount of users cause one or more respective computing devices to perform each action. For example, the model may be trained on user information indicating that 65% of users request both weather and traffic information in the morning. Thus, in such examples, assistant module 222 may determine that a routine (e.g., a morning routine) associated with a particular command (e.g., "Hey computer, tell me about my day") includes an action to output traffic information and an action to output weather information.

In some examples, assistant module 222 determines whether to customize a group of actions that are associated with a particular user and a particular command. Assistant module 222 may determine whether to customize the group of actions based at least in part on a user profile that is stored in user information data store 224 and is associated with the particular user. In some examples, the user profile includes one or more indications of explicit and/or implicit feedback from a user, such that assistant module 222 may determine whether to customize the group of actions associated with a particular user and particular command based on explicit and/or implicit feedback from a user. For example, the user profile may include an indication of explicit feedback, such as an explicit command to include, and/or refrain from including, one or more actions in a custom group of actions. For instance, computing device 210 may receive an explicit command (e.g., "hey computer, don't tell me the news when I ask about my day") such that assistant module 222 may determine that assistant module 222 should customize the group of actions associated with that command. Thus, in some examples, assistant module 222 may update the user profile associated with the particular user to indicate the user is not interested in news information. Assistant module 222 may update the user profile to indicate that the group of actions associated with that particular command should not include news information, or to indicate that none of the groups of actions associated with the particular user (e.g., regardless of the command) should include news information.

In some examples, assistant module 222 may output a notification (e.g., an audible message) that includes a request for explicit feedback about a particular action. For example, assistant module 222 may receive an indication that a new action is available for one or more computing devices associated with the particular user and may request explicit feedback from the user. A developer of a particular application module 226 may add a feature to the particular application module 226 enabling computing device 210 to perform a new action in response to receiving a particular command. A computing device manufacturer (e.g., an intelligent thermostat manufacturer) may add a new feature to the computing device. Assistant module 222 may receive (e.g., from the application developer or device manufacturer) an indication of the new action, and may determine to customize the group of actions associated with the particular command and particular user in response to receiving the indication of the new action.

Responsive to determining that a new action (e.g., remotely adjusting a thermostat) exists for a vehicle associated with the user, assistant module 222 may output a notification indicative of the new action and requesting further instructions from the user. For instance, assistant module 222 may cause an output device (e.g., a speaker) to output a message "Did you know I can adjust the temperature in your car? Would you like me to turn on the AC as part of your afternoon routine?" Responsive to receiving a command to add the new action to a group of actions (e.g., a group of actions associated particular routine), assistant module 222 may customize the group of actions associated with a particular command to include the new action. For instance, assistant module 222 may determine that the custom group of actions associated the command "Hey computer, I'm heading home in 5 minutes" includes executing one or more actions associated with the vehicle, such as adjusting the temperature inside the vehicle cabin.

In some instances, assistant module 222 may determine whether to customize a group of actions associated with a particular command and particular user based on implicit feedback, such as repeated user interactions. For instance, a user information data store (e.g., data store 224) may include a user profile associated with the particular user that indicates how much the particular user commands assistant module 222 (or an assistant module on other computing devices associated with the particular user) to perform various actions. Responsive to receiving an indication of a particular command at least a threshold a threshold number of times (or at least a threshold number of times within a certain period of time) from a particular user, assistant module 222 may determine to customize a group of actions associated with the particular command. In other words, assistant module 222 may determine to customize a group of actions associated with a particular command and a particular user after receiving the particular command at least a threshold number of times from the particular user.

Assistant module 222 may customize a group of actions associated with a particular command and a particular user in response to determining that a computing device which was not previously associated with the particular user is now associated with the particular user. In some examples, the particular user may purchase a vehicle with a computing device that includes an assistant module, such that assistant module 222 may update the user profile corresponding to the particular user to indicate that a group of computing devices associated with the particular user includes the new vehicle. In these examples, assistant module 222 may customize a group of actions associated with a particular command in response to determining that the user is associated with an assistant enabled vehicle. Thus, in some instances, assistant module 222 may customize the group of actions associated with the command "Computer, I'm off to work" by adding actions associated with the vehicle (e.g., remotely starting the vehicle, adjusting the cabin temperature, etc.) to that group of actions.

In some examples, assistant module 222 customizes a group of actions in response to receiving a notification. For example, assistant module 222 may receive a notification from another computing device (e.g., an assistant enabled computing device associated with the particular user) or from an application or service executing at or accessible from computing device 210 and may customize the group of actions associated with a particular command in response to receiving the notification. For instance, a countertop home assistant device may receive a command (e.g., "Computer, tell my spouse to pick up milk on the way home") from a spouse of the user of computing device 210. Assistant module 222 of computing device 210 may customize a group of actions associated with an afternoon routine in response to receiving the command. As another example, computing device 210 may receive a notification (e.g., a text message) and may store an indication of the notification in the user profile. For instance, computing device 210 may receive a text message that includes a message "Will you please pick up milk on the way home?" and may add a reminder to pick up milk to the user profile. Thus, assistant module 222 may customize the group of actions associated with a particular command for an afternoon routine (e.g., "Hey computer, let's get ready to go home") to include outputting a notification or message that includes a reminder to pick up milk.

In some examples, assistant module 222 determines a custom group of actions associated with a particular command and a particular user. For example, assistant module 222 may create a new custom group of actions and/or update an existing custom group of actions to include one or more actions that are relevant to the particular user (e.g., and to a particular routine).

Assistant module 222 determines whether a particular action is relevant to a particular user by determining and assigning a relevancy score to the action and comparing the relevancy scores to a relevancy threshold. The relevancy score for a particular action may indicate a probability that a user will cause assistant module 222 to perform that action. Assistant module 222 may determine that a particular action (e.g., outputting weather information) is relevant to the user when the relevancy score corresponding to the action satisfies (e.g., is greater than or equal to) the relevancy threshold.

Assistant module 222 may generate a custom group of actions by modifying or updating an existing, default group of actions. For instance, assistant module 222 may assign a relevancy score to each action from a default group of actions that are associated with the particular command to determine whether any of the actions from the default group of actions are relevant to a particular user (e.g., by satisfying a relevancy threshold) and therefore should be included in a custom group of actions. In some cases, assistant module 222 may assign relevancy scores to one or more actions that are not already included in a default group of actions. Assistant module 222 may generate custom group of actions by combining any actions, either from a default group or not from a default group, that have relevancy scores that satisfy a relevancy threshold, and are associated with a particular command or routine. In this way, the actions included in a custom group of actions may include one or more actions from a default group of actions associated with a command and/or one or more actions that are not necessarily part of the default group of actions.

Assistant module 222 may assign a relevancy score based on explicit user feedback. For instance, assistant module 222 may receive an explicit command (e.g., "hey computer, don't tell me the news when I ask about my day") and may assign a relevancy score (e.g., 0 out of 100) to an action associated with (e.g., an action identified by) that command. In some examples, assistant module 222 assigns a relevancy score to respective actions based on the user interaction data within the user profile stored in data store 224. For example, assistant module 222 may assign a higher relevancy score to a particular action the more the user causes computing device 210 to perform that action. For instance, assistant module 222 may assign a high relevancy score (e.g., 90 out of 100) to a particular action if the user causes computing device 210 to execute the action several times a week, a medium relevancy score (e.g., 50 out of 100) if the user causes computing device 210 to execute the action once a week, and a low relevancy score (e.g., 20 out of 100) if the user causes computing device 210 to execute the action less than once a week. Assistant module 222 may determine whether the relevancy score corresponding to a particular action satisfies (e.g., is greater than or equal to) a relevancy threshold and may include the particular action within a custom group of actions in response to determining that the relevancy score corresponding to a particular action satisfies a relevancy threshold.

As one example, assistant module 222 may determine that data store 224 includes information indicating the particular user frequently (e.g., every week day) causes computing device 210 to adjust a home thermostat at approximately the same time that the user leaves for work and may assign a relatively high (e.g., 90 out of 100) relevancy score based on the usage information. Thus, in this example, assistant module 222 determines that the custom group of actions associated with that command and the particular user includes adjusting the thermostat (e.g., even though the default group of actions associated with a command for a morning routine might not include adjusting the thermostat). In some examples, assistant module 222 determines that the custom group of actions does not include a particular action (e.g., an action from the default group of actions) in response to determining that the corresponding relevancy score does not satisfy a relevancy threshold. For example, data store 224 may include information indicating the particular user rarely (e.g., once a month) causes computing device 210 to brew a cup of coffee. Assistant module 222 may assign a relatively low (e.g., 10 out of 100) relevancy score based on the usage information. Thus, while the default group of actions associated with a command for a morning routine may include brewing coffee, the custom group of actions associated with that command and the particular user may not include brewing coffee.

In some examples, assistant module 222 determines the custom group of actions based on a type of computing device with which the user is interacting. For example, assistant module 222 may determine the relevancy score for a particular action based on the type of computing device the user interacts with. For instance, when the particular user interacts with computing device 210, assistant module 222 may assign one relevancy score to a particular action when computing device 210 is a certain type of computing device and another relevancy score to the same action when computing device 210 is a different type of computing device. In some examples, when a user interacts with a particular type of computing device 210 (e.g., a mobile phone, vehicle head unit, etc.), assistant module 222 may assign a higher relevancy score to actions which the particular type of computing device is configured to perform.

For example, when the particular user interacts with computing device 210 and computing device 210 includes a vehicle head unit, assistant module 222 may assign a relatively high (e.g., higher than a threshold) relevancy score to an action for outputting traffic information and a relatively low (e.g., lower than a threshold) relevancy score to brewing coffee. Thus, assistant module 222 may determine that the custom group of actions associated with the command "Computer, let's get the day started" includes outputting traffic information (e.g., visually) but does not include turning on a coffeemaker when computing device 210 is a vehicle.

As another example, when computing device 210 includes a countertop home assistant device, assistant module 222 may assign a relatively high (e.g., lower than a threshold) relevancy score to brewing coffee. Thus, in some instances, assistant module 222 may determine that the custom group of actions associated with the particular user and the command "Computer, let's get the day started" includes turning on a coffee maker when computing device 210 includes a countertop home assistant device. In this way, assistant module 222 may determine that the custom group of actions includes one group of actions when computing device 210 is a certain type of computing device and another group of actions when computing device 210 is a different type of computing device.

Assistant module 222 may receive an indication of a particular command. For example, UIC 212 may detect a keyboard input, gesture input, or audible input indicative of a command and may send an indication of the command to assistant module 222. In some examples, assistant module 222 may receive an indication of the particular command from another computing device (e.g., an intelligent lock or garage door opener) via a communication unit 242. For instance, responsive to receiving a command to open a garage door (e.g., upon a user returning home from work) an intelligent garage door opener may send a notification indicative of the command to open the door to computing device 210, such that assistant module 222 may receive the notification indicative of the command to open the door. As another example, assistant module 222 may receive an indication of an audible command "Computer, tell me about my day."

Responsive to receiving an indication of a particular command, assistant module 222 may determine whether the command originated from a particular user. Assistant module 222 may determine whether the command originated from the particular user based on biometrics (e.g., voice, face, or handwriting recognition). For example, user information data store 224 may include a voice fingerprint for the particular user and may compare the indication of the audible command to the voice fingerprint to determine whether an audible command was spoken by the particular user. For instance, assistant module 222 may determine that the audible command was spoken by the particular user in response to determining that the spoken command corresponds to the voice fingerprint for the particular user. Assistant module 222 may capture one or more images prior to, during, and/or after receiving a command and may determine whether a command originated from the particular user based on the one or more images. For instance, assistant module 222 may perform facial recognition on at least one captured image and may determine that the command originated from the particular user in response to determining that at least one captured image includes an image of the particular user.

Responsive to determining that the command did not originate from the particular user, assistant module 222 may execute one or more actions from the default group of actions associated with the particular command. In some examples, assistant module 222 may execute each action from the default group of actions. For example, responsive to receiving a command "Hey computer, tell me about tonight" and determining the command did not originate from the particular user (e.g., assistant module 222 may determine the voice producing the command is for an unknown user), assistant module 222 may output weather information and information about nearby activities occurring that evening.

Responsive to determining that the command originated from the particular user, assistant module 222 may determine whether a custom group of actions associated with the command exists for the particular user. For instance, assistant module 222 may query a user information data store (e.g., one or more of data stores 224 and/or 124) to determine whether the data store includes a custom group of actions for the particular user. In some examples, assistant module 222 determines (e.g., based on the query results) that a custom group of actions associated with the particular command and the particular user does not exist. Responsive to determining that a custom group of actions associated with the particular command and the particular user does not exist, assistant module 222 may execute at least one action from a default group of actions associated with the particular command. For example, assistant module 222 may execute one or more actions associated with the particular command and a particular type of user. For instance, when the particular user is a first type of user (e.g., a user living in a particular geographic area), assistant module 222 may query user information data store 224 to determine a group of actions associated with the particular command and that type of user.

Assistant module 222 may execute one or more actions from the custom group of actions in response to determining that the command originated from the particular user. In some scenarios, assistant module 222 may execute one or more actions from the custom group of actions in response to determining that the command originated from the particular user and that a custom group of actions associated with the command exists for the particular user. Assistant module 222 may execute each action from the custom group of actions. Assistant module 222 may execute a plurality (e.g., all or a subset) of actions from the custom group of actions by causing one or more computing devices associated with the user to execute each action in the plurality of actions. For instance, when the custom group of actions includes brewing a cup of coffee, adjusting a temperature in a vehicle, and outputting traffic information, assistant module 222 may output a message to a coffeemaker (e.g., one of computing devices 110 of FIG. 1) instructing the coffeemaker to brew a cup of coffee, a message to a vehicle instructing the vehicle to adjust the temperature in the vehicle cabin, and output audio data (e.g., audibly outputting information) indicative of the expected traffic conditions. Thus, a first computing device (e.g., a coffeemaker) may execute a first action of the custom group of actions, a second computing device (e.g., a vehicle head unit) may execute a second action of the custom group of actions, and a third computing device (e.g., computing device 210) may execute a third action of the custom group of actions. In some examples, assistant module 222 may output a message to another computing device (e.g., the coffeemaker) directly (e.g., via Bluetooth®, or via Wi-Fi® when both computing device 210 and the other computing device are on the same home network). In some examples, assistant module 222 may output a message to message to another computing device indirectly via another computing device, such as a server. For example, assistant module 222 may output a message to server 160 of FIG. 1, such that assistant module 122B may send a message to the coffeemaker to brew the coffee. While described as utilizing three computing devices to execute the actions in the custom group of actions, assistant module 222 may cause any number (e.g., one, two, five, etc.) of computing devices to execute actions from the custom group of actions.

In some examples, the custom group of actions includes at least one action to be executed each time a particular command is received. For example, assistant module 222 may cause one or more computing devices associated with the user to output weather information and traffic information each time that a particular command is received (e.g., each time the command "Computer, tell me about my day" is received from the particular user). In some instances, the custom group of actions includes one or more actions to be executed a predetermined number of times (e.g., once, twice, etc.). For instance, responsive to receiving a notification that includes a message from a user's spouse to "pick up milk on the way home", assistant module 222 of computing device 210 may cause computing device 210 to output a message that includes a reminder to pick up milk a single time (e.g., the next time assistant module 222 receives a command associated with an afternoon routine). In some scenarios, assistant module 222 may customize the group of actions associated with that particular command to include outputting a notification when that particular command is received from the particular user within a particular period of time (e.g., within the next 24 hours).

Figure 3:
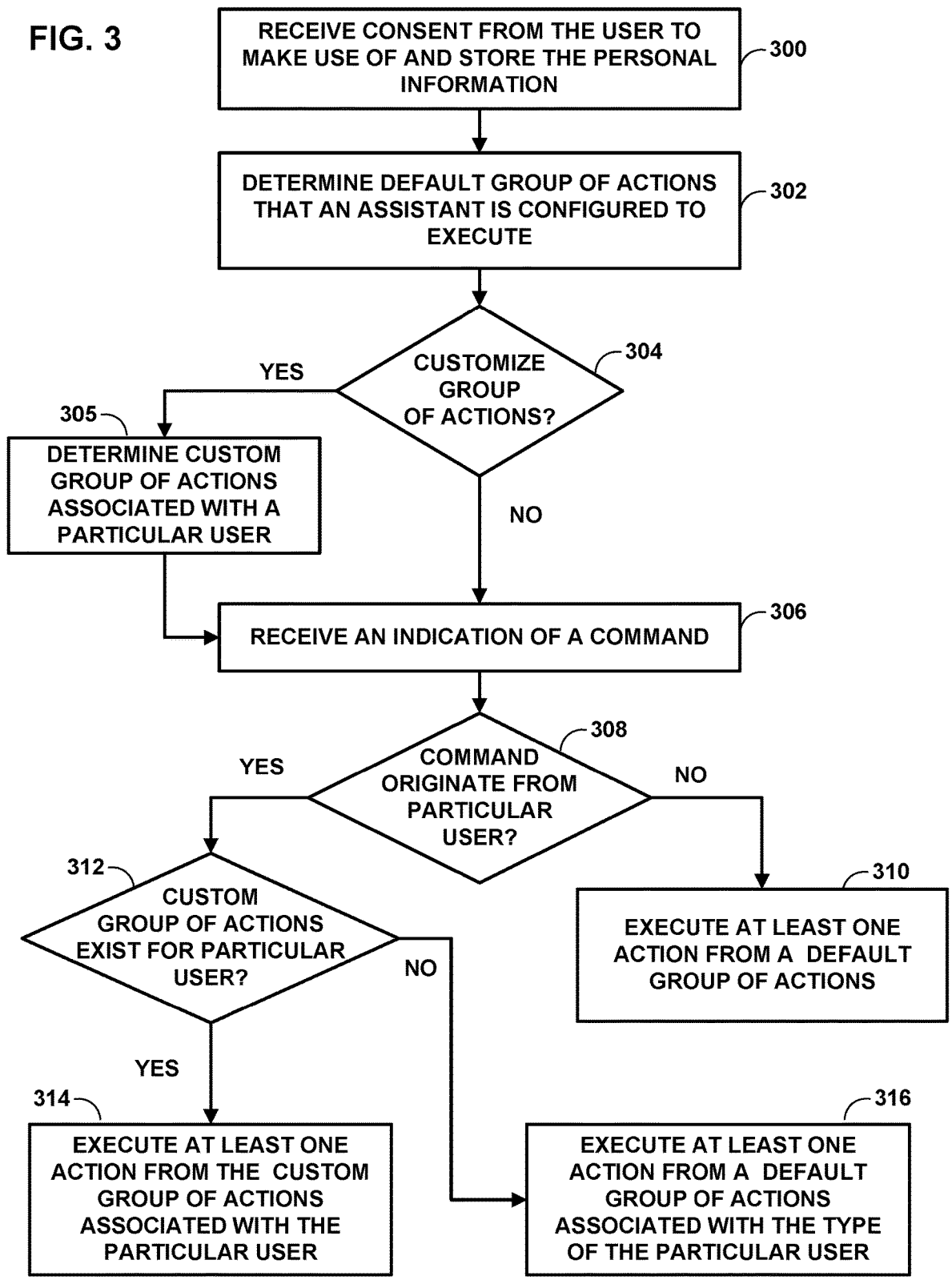
FIG. 3 is a flowchart illustrating example operations performed by one or more processors executing an example virtual assistant, in accordance with one or more aspects of the present disclosure.

FIG. 3 is a flowchart illustrating example operations performed by one or more processors executing an example virtual assistant, in accordance with one or more aspects of the present disclosure. FIG. 3 is described below in the context of computing device 110 of FIG. 1. For example, assistant module 122B, while executing at one or more processors of computing device 110A, may perform operations 300-316, in accordance with one or more aspects of the present disclosure.

In operation, computing device 110A receives consent from a user to make use of and store the personal information (300). For instance, in response to identifying potential personal information, assistant module 122B may cause UI module 120 to request permission from the user to store and make use of personal information obtained during interactions with assistant module 122B and the user. It should be understood that computing device 110A may not require a user to consent prior to each time that assistant module 122B wants to make use of or store personal information. For example, if computing devices 110A receives consent once a year, once a day, or even just one time (e.g., after initial product purchase, set up, etc.) computing device 110A may treat that prior consent as consent to make use and store personal information in the future.

Assistant module 122B determines a default group of actions that the assistant is configured to execute in response to receiving a particular audible command (302). In other words, assistant module 122B may determine a default group of actions that is associated with a particular command and the assistant module 122B may be configured to execute the default group of actions in response to receiving the particular audible command. In some examples, assistant module 122B determines a default group of actions that are associated with all users of assistant module 122B. Assistant module 122B may determine a default group of actions that are associated with a particular type of user. Assistant module 122B may determine the default group of actions by querying a pre-programmed group of actions. In some examples, assistant module 122B determines the default group of actions using machine learning. For example, assistant module 122B may apply a model to user information stored in data store 124B and may output a group of actions associated with a particular command.

Assistant module 122B determines whether to customize a group of actions associated with a particular command for a particular user (304). For instance, assistant module 122B may be configured to execute a custom group of actions in response to receiving the particular audible command from a particular user. Assistant module 122B may determine whether to customize a group of actions based at least in part on a user profile associated with the particular user. In some examples, the user profile includes one or more indications of explicit and/or implicit feedback from a user, such that assistant module 122B may determine whether to customize the group of actions associated with a particular user and particular command based on explicit and/or implicit feedback from a user. For instance, assistant module 122B may receive a command providing explicit feedback (e.g., "Computer, add starting my vehicle to my morning routine") such that assistant module 122B may determine that assistant module 122B should customize the group of actions associated with a command for a morning routine. In some examples, the user profile includes user interaction data and may determine to customize the group of actions based on the user interaction data. For instance, a user may frequently command assistant module 122B to brew a cup of coffee in the morning, such that assistant module 122 may determine to customize a group of actions associated with a particular command (e.g., that is associated with a morning routine) in response to determining that the particular user has requested assistant module 122B to perform the action at least a threshold amount. In some examples, assistant module 122B determines to customize the group of actions associated with a particular command in response to receiving a notification. As another example, assistant module 122B may customize the group of actions associated with a command in response to determining that a new computing device which was not previously associated with the particular user is now associated with the particular user.

In some instances, responsive to determining to customize a group of actions associated with a particular command ("YES" branch of 304), assistant module 122B determines a custom group of actions associated with a particular command and a particular user (305). For instance, assistant module 122B may determine a custom group of actions associated with a particular command and a particular user by generating a custom group of actions. Assistant module 122B may determine a custom group of actions by updating an existing custom group of actions (e.g., by adding and/or removing actions) associated with a particular command and a particular user. The custom group of actions may include one or more actions from the default group of actions associated with the particular command, one or more actions that are not included in the default group of actions associated with the particular command. In some instances, the custom group of actions does not include one or more actions from the default group of actions associated with the particular command. Assistant module 122B may assign a relevancy score to one or more respective actions (e.g., based on the user profile for a particular user) and may compare the respective relevancy scores to relevancy threshold. For instance, assistant module 122B may assign a relatively high relevancy score (e.g., 100 out of 100) to a particular action (e.g., locking a door) in response to receiving explicit feedback from a user (e.g., "hey computer, lock the door when I go to work"). In some examples, assistant module 122B determines that the custom group of actions includes a particular action in response to determining the relevancy score satisfies the relevancy threshold.

Assistant module 122B receives an indication of the particular command (306). For example, UIC 112 may detect a user input indicating a command and may send an indication of the command to assistant module 122B. For instance, UIC 112 may include a microphone that detects audible commands, and may send an indication of an audible command to assistant module 122B in response to detecting an audible command.

Assistant module 122B determines whether the indication of particular audible command originated from the particular user (308). For example, assistant module 122B may perform voice recognition on the data received from UIC 112 to determine whether the particular user spoke the particular command. In some examples, assistant module 122B may receive an indication of one or more images (e.g., captured by an image sensor of computing device 110A at approximately the same time an audible command was received). Assistant module 122B may perform facial recognition on at least one captured image and may determine that the command originated from the particular user in response to determining that at least one captured image includes an image of the particular user.

Responsive to determining that the indication of particular audible command originated from the particular user ("NO" branch of 308), assistant module 122B executes each action from the default group of actions (310). For instance, assistant module 122B may cause one or more of computing devices 110 to execute various actions from the default group of actions.

Responsive to determining that the indication of particular audible command originated from the particular user ("YES" branch of 308), assistant modules 122 determines whether a custom group of actions for the particular user and particular audible command exists (312). In some examples, assistant module 122B queries a user information data store (e.g., one or more of data stores 224 and/or 124) to determine whether the data store includes a custom group of actions for the particular user. For example, assistant module 122B may determine that a custom group of actions associated with the particular user and particular command exists in response to receiving information indicating of one or more groups of custom actions associated with the particular user and particular command and may determine that a custom group of actions does not exist in response to the query returning an empty set.

Assistant module 122B executes at least one action from a default group of actions associated with a type of the particular user and the particular command (316) in response to determining that a custom group of actions associated with the particular user and particular command does not exist ("NO" branch of 312). For example, assistant module 122B may determine a type of user for the particular user and query user information data stores 124 for actions associated with that type of user. Responsive to receiving an indication of one or more actions associated with that type of user, assistant module 122B executes at least one of the one or more actions. For instance, assistant module 122B may send a command to one or more computing devices associated with the particular user to execute one or more actions from the default group of actions associated with that type of user.

Responsive to determining that a custom group of actions associated with the particular user and particular command does exist ("YES" branch of 312), assistant module 122B executes one or more actions from the custom group of actions associated with the particular user and particular command (314). In some examples, assistant module 122B executes each action from the custom group of actions. Assistant module 122B may cause computing devices 110 to perform one or more of the actions in the custom group of actions. For example, when computing device 110A includes a countertop home assistant device and the custom group of actions includes outputting weather information, assistant module 122B may cause computing device 110A to output (e.g., audibly) the weather information. In some examples, assistant module 122B may cause another computing device associated with the user to execute one or more actions from the default group of actions. For example, when the custom group of actions includes outputting traffic information and computing device 110B includes a vehicle head unit, assistant module 122B may cause computing device 110B to output (e.g., for display) the traffic information.

Figure 4:
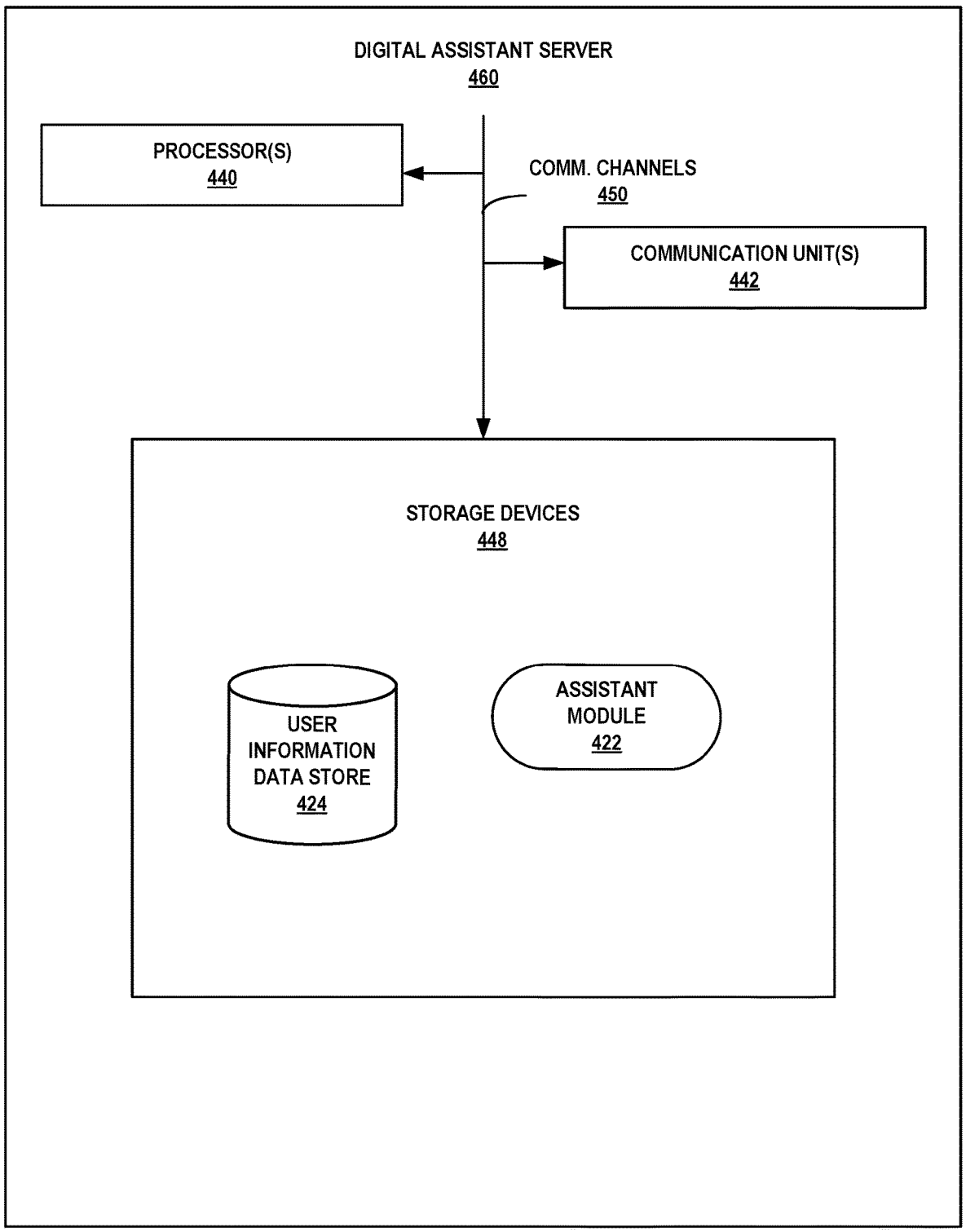
FIG. 4 is a block diagram illustrating an example digital assistant server that is configured to execute an example virtual assistant, in accordance with one or more aspects of the present disclosure.

FIG. 4 is a block diagram illustrating an example computing system that is configured to execute an example virtual assistant, in accordance with one or more aspects of the present disclosure. Digital assistant server 460 of FIG. 4 is described below as an example of digital assistant server 160 of FIG. 1. FIG. 4 illustrates only one particular example of digital assistant server 460, and many other examples of digital assistant server 460 may be used in other instances and may include a subset of the components included in example digital assistant server 460 or may include additional components not shown in FIG. 4.

As shown in the example of FIG. 4, digital assistant server 460 includes one or more processors 440, one or more communication units 442, and one or more storage devices 448. Storage devices 448 include assistant module 422, user information data store 424, and search module 482.

Processors 440 are analogous to processors 240 of computing system 210 of FIG. 2. Communication units 442 are analogous to communication units 242 of computing system 210 of FIG. 2. Storage devices 448 are analogous to storage devices 248 of computing system 210 of FIG. 2. Communication channels 450 are analogous to communication channels 250 of computing system 210 of FIG. 2 and may therefore interconnect each of the components 440, 442, and 448 for inter-component communications. In some examples, communication channels 450 may include a system bus, a network connection, an inter-process communication data structure, or any other method for communicating data.

User information data store 424 is analogous to user information data store 224 of FIG. 2 and is configured to store information associated by the user that assistant module 422 has learned about the user of a computing device during conversations between the user and an assistant provided by assistant module 422. Assistant module 422 may rely on the information stored at data store 424, to determine events and select actions related to the events for inclusion in notifications sent by assistant module 422.

Assistant module 422 may include some or all functionality of assistant modules 122 of FIG. 1 and assistant module 222 of computing device 210 of FIG. 2. Assistant module 422 may perform similar operations as assistant modules 122 and 222 for providing an assistant service that is accessible via a network, such as network 130. That is, assistant module 422 may act as an interface to a remote assistant service accessible to a computing device that is communicating over a network with digital assistant server 460. For example, assistant module 422 may be an interface or API to assistant module 122B of digital assistant server 160 of FIG. 1.

In operation, assistant module 422 may determine a default group of actions associated with a particular (e.g., audible) command. The default group of actions may be associated with all users of computing devices 110, 116 or a subset of users (e.g., a type of users that are similar to one another). For example, assistant module 422 may determine the default group of actions by retrieving a pre-programmed group of actions from a memory device. Assistant module 422 may determine the default group of actions by applying a model to user information stored in data store 424. The default group of actions may include actions that users of computing devices 110, 116 frequently perform, utilize computing devices 110, 116 to perform, or both. The default group of actions may include frequently performed actions (e.g., the most frequently performed actions or the most frequently executed at a certain time of day, such as morning, afternoon, evening, etc.). In some examples, the default group of actions includes actions associated with one another (e.g., when a threshold amount of users who perform one action also perform a second action at approximately the same time).

Assistant module 422 may determine whether to customize a group of actions associated with a particular command and a particular user. Assistant module 422 may determine whether to customize a group of actions based at least in part on a user profile associated with the particular user. In some examples, the user profile includes one or more indications of explicit and/or implicit feedback from a user, such that assistant module 422 may determine whether to customize the group of actions associated with a particular user and particular command based on explicit and/or implicit feedback from a user. Assistant module 422 may determine to customize the group of actions associated with a particular command in response to receiving a notification. In some instances, assistant module 422 may determine to customize the group of actions associated with a particular command in response to determining that a new computing device which was not previously associated with the particular user is now associated with the particular user.

Assistant module 422 may determine a custom group of actions based on the default group of actions and a user profile associated with the particular user. For example, data store 424 may include a user profile associated with the particular user, such as usage information, interests, etc. Assistant module 422 may include a particular action in the custom group of actions in response to determining that the particular action is relevant to the particular user. For example, assistant module 422 may assign a relevancy score to one or more actions based on the information in the user profile (e.g., action usage information, user interests, etc.) and determines that a particular action is relevant to that particular user when the relevancy score satisfies (e.g., is greater than or equal to) a relevancy threshold. In some examples, assistant module 422 determines whether to include an action in a custom group of actions based on a type of computing device with which the user is interacting.

Assistant module 422 may receive an indication of a command. For example, computing device 110A of FIG. 1 may receive an input indicative of a command (e.g., a keyboard input, a gesture, an audible command) and may send an indication of the command to computing device 460. Assistant module 422 may receive the indication of the command and may determine whether the command originated from a particular user in response to receiving an indication of a particular command. For instance, assistant module 422 may determine whether the command originated from the particular user based on biometrics (e.g., voice, face, or handwriting recognition). For example, user information data store 424 may include a voice fingerprint for the particular user and may compare the indication of the audible command to the voice fingerprint to determine whether an audible command was spoken by the particular user. For instance, assistant module 422 may determine that the audible command was spoken by the particular user in response to determining that the spoken command corresponds to the voice fingerprint for the particular user.

Responsive to determining that the command did not originate from the particular user, assistant module 422 may execute one or more actions from the default group of actions. For instance, when the default group of actions includes outputting news and weather information, assistant module 422 may cause one or more of computing devices 110 to output the news information and weather information.

Responsive to determining that the command originated from the particular user, assistant module 422 may execute one or more actions from the custom group of actions associated with the particular user. For example, when the custom group of actions includes outputting weather and traffic information, and starting the user's vehicle, assistant module 422 may cause one or more computing devices 110 to output the weather and traffic information and start the user's vehicle. For instance, assistant module 422 may cause a first computing device (e.g., a counter top home assistant, which may not have a display device) to audibly output weather information and a second, different computing device (e.g., within a vehicle) to start the vehicle and output for display (e.g., via a display device within the vehicle) to display traffic information (e.g., a traffic map).

The following numbered examples may illustrate one or more aspects of the disclosure:

Example 1. A method comprising: determining, by an assistant executing at one or more processors, a default group of actions that the assistant is configured to execute in response to receiving a particular audible command; determining, by the assistant, based on the default group of actions and a user profile associated with a particular user, a custom group of actions that the assistant is configured to execute in response to receiving the particular audible command from the particular user; receiving, by the assistant, an indication of the particular audible command; determining, by the assistant, whether the indication of particular audible command originated from the particular user; and responsive to determining that the indication of particular audible command originated from the particular user, executing, by the assistant, each action from the custom group of actions.

Example 2. The method of example 1, wherein the indication of the particular audible command is a first indication of the particular audible command, the method further comprising: receiving, by the assistant, a second indication of the particular audible command; determining, by the assistant, whether the second indication of particular audible command originated from the particular user; and responsive to determining that the second indication of particular audible command did not originate from the particular user, executing, by the assistant, each action from the default group of actions.

Example 3. The method of any one of examples 1-2, wherein executing each action from the custom group of actions comprises causing one or more computing devices associated with the user to execute each action from the custom group of actions.

Example 4. The method of any one of examples 1-3, further comprising: determining, by the assistant, whether a custom group of actions associated with the particular user and particular command exists in response to determining that the indication of the particular audible command originated from the particular user, wherein executing each action from the custom group of actions is further responsive to determining that the custom group of actions associated with the particular user and particular command exists.

Example 5. The method of example 4, wherein the indication of the particular audible command is a first indication of the particular audible command that is received at a first time, the method further comprising: receiving, by the assistant, a second indication of the particular audible command at a second time that is earlier than the first time; determining, by the assistant, whether the second indication of particular audible command originated from the particular user; and responsive to determining that the second indication of the particular audible command originated from the particular user, determining, by the assistant, whether a custom group of actions associated with the particular user and particular command does not exist; responsive to determining that the custom group of actions associated with the particular user and particular command exists, executing, by the assistant, each action from a default group of actions that are associated with the particular command and a type of user corresponding to the particular user.

Example 6. The method of any one of examples 1-5, further comprising: determining, by the assistant, whether the assistant has received an indication of the particular audible command at least a threshold number of times, wherein determining the custom group of actions is responsive to determining that the assistant has received an indication of the particular audible command at least the threshold number of times.

Example 7. The method of any one of examples 1-6, wherein determining the custom group of actions is responsive to determining that a new computing device is associated with the particular user.

Example 8. The method of examples 7, further comprising: determining, by the assistant, a new action associated with the new computing device, outputting, by the assistant, an indication of the new action; and receiving, by the assistant, an indication of a command to add the new action to the custom group of actions, wherein determining the custom group of actions is further responsive to receiving the indication of the command to add the new action to the custom group of actions.

Example 9. The method of any one of examples 1-8, wherein determining the custom group of actions further comprises determining the custom group of actions based on a type of computing device the particular user is interacting with.

Example 10. The method of any one of examples 1-9, wherein the custom group of actions includes an action to be executed each time the particular audible command is received and an action to be executed a predetermined number of times.

Example 11. The method of any one of examples 1-10, wherein executing each action from the group of actions comprises: executing, by a first computing device, at least a first action from the custom group of actions; and executing, by a second computing device, at least a second action from the custom group of actions.

Example 12. A computing system comprising: an output device; at least one processor; and at least one memory comprising instructions that when executed, cause the at least one processor to execute an assistant configured to: determine a default group of actions that the assistant is configured to execute in response to receiving a particular audible command; determine, based on the default group of actions and a user profile associated with a particular user, a custom group of actions that the assistant is configured to execute in response to receiving the particular audible command from the particular user; receive, an indication of the particular audible command; determine, whether the indication of particular audible command originated from the particular user; and responsive to determining that the indication of particular audible command originated from the particular user, execute each action from the custom group of actions.

Example 13. The computing system of example 12, wherein the assistant is further configured to: receive, a second indication of the particular audible command; determine, whether the second indication of particular audible command originated from the particular user; and responsive to determining that the second indication of particular audible command did not originate from the particular user, execute each action from the default group of actions.

Example 14. The computing system of any one of examples 12-13, wherein the assistant is further configured to: determine whether a custom group of actions associated with the particular user and particular command exists in response to determining that the indication of the particular audible command originated from the particular user; and execute each action from the custom group of actions in further response to determining that the custom group of actions associated with the particular user and particular command exists.

Example 15. The computing system of example 14, wherein the indication of the particular audible command is a first indication of the particular audible command that is received at a first time, wherein the assistant is further configured to: receive a second indication of the particular audible command at a second time that is earlier than the first time; determine whether the second indication of particular audible command originated from the particular user; responsive to determining that the second indication of the particular audible command originated from the particular user, determine whether a custom group of actions associated with the particular user and particular command does not exist; and responsive to determining that the custom group of actions associated with the particular user and particular command exists, execute each action from a default group of actions that are associated with the particular command and a type of user corresponding to the particular user.

Example 16. The computing system of any one of examples 11-14, wherein the assistant is further configured to: determine whether the assistant has received an indication of the particular audible command at least a threshold number of times, determine the custom group of actions in response to determining that the assistant has received an indication of the particular audible command at least the threshold number of times.

Example 16. The computing system of any one of examples 11-15, wherein the assistant is further configured to determine the custom group of actions in response to determining that a new computing device is associated with the particular user.

Example 17. The computing system of example 16, wherein the assistant is further configured to: determine a new action associated with the new computing device, output an indication of the new action; and receive an indication of a command to add the new action to the custom group of actions, wherein the assistant is configured to determine the custom group of actions in further response to receiving the indication of the command to add the new action to the custom group of actions.

Example 18. The computing system of any one of examples 11-17, wherein the assistant is configured to determine the custom group of actions further based on a type of computing device the particular user is interacting with.

Example 19. The computing system of any one of examples 11-18, wherein the custom group of actions includes an action to be executed each time the particular audible command is received and an action to be executed a predetermined number of times.

Example 20. A computer-readable storage medium comprising instructions that, when executed cause at least one processor of a digital assistant system to: determine a default group of actions that the assistant is configured to execute in response to receiving a particular audible command; determine, based on the default group of actions and a user profile associated with a particular user, a custom group of actions that the assistant is configured to execute in response to receiving the particular audible command from the particular user; receive an indication of the particular audible command; determine whether the indication of particular audible command originated from the particular user; and responsive to determining that the indication of particular audible command originated from the particular user, execute each action from the custom group of actions.

Example 21. A computing device comprising at least one processor and at least one memory comprising instructions that when executed, cause the at least one processor to perform the method of any one of examples 1-11.

Example 22. A computer-readable storage medium comprising instructions that, when executed cause at least one processor of a computing device to perform the method of any one of examples 1-11.

Example 23. A system comprising means for performing the method of any one of examples 1-11.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   determining, by an assistant executing at least in part on a computing device of a user, a default group of actions for a routine that the assistant is configured to execute in response to satisfaction of a particular condition;
   receiving, by the computing device of the user, a notification associated with an application installed on the computing device of the user;
   determining, by the assistant and based on the received notification, to customize the routine for the user for a particular period of time,
      wherein customizing the routine for the particular period of time comprises causing an additional action to be performed during the routine when the particular condition is satisfied within the particular period of time, and
      wherein the additional action is determined based on the received notification and wherein the additional action is not included in the default group of actions; and
   subsequent to customizing the routine for the user for the particular period of time, and during the particular period of time:
      receiving, by the assistant, an indication of satisfaction of the condition; and
      responsive to receiving the indication of satisfaction of the condition during the particular period of time, executing, by the assistant, the customized routine, including executing the additional action and at least one action from the default group of actions.

2. The method of claim 1, wherein the particular condition being satisfied comprises determining that a particular command was spoken and was directed to the automated assistant.

3. The method of claim 1, wherein executing the customized routine, including executing the additional action and at least one action from the default group of actions, includes causing one or more additional computing devices associated with the user to execute the additional action and/or the at least one action from the default group of actions.

4. The method of claim 1, wherein determining, by the assistant and based on the received notification, to customize the routine for the user for the particular period of time includes:
   identifying a user profile, of the user, based on processing image data and/or audio data, and
   determining to customize the routine for the user for the particular period of time based on information included in the user profile of the user.

5. The method of claim 1, further comprising:
   subsequent to executing the customized routine responsive to the indication of the satisfaction of the condition, and during the particular period of time:
      receiving, by the assistant, a subsequent indication of satisfaction of the condition; and
      responsive to receiving the subsequent indication of the satisfaction of the condition, again executing, by the assistant, the customized routine, including executing the additional action and the at least one action from the default group of actions.

6. The method of claim 1, further comprising:
subsequent to executing the customized routine responsive to the indication of the satisfaction of the condition, and during the particular period of time:
receiving, by the assistant, a subsequent indication of satisfaction of the condition; and
responsive to receiving the subsequent indication of the satisfaction of the condition, executing, by the assistant, the default group of actions for the routine without the additional action, wherein executing the default group of actions for the routine without the additional action is based on the subsequent indication of the satisfaction of the condition being received subsequent to the indication of the satisfaction of the condition.

7. A method, comprising:
determining, by an assistant executing at least in part on a computing device of a user, a default group of actions for a routine, for the user, that the assistant is configured to execute in response to satisfaction of a particular condition;
receiving, by the assistant, an indication that the particular condition is satisfied during a particular time of day;
executing, by the assistant, each action from the default group of actions for the routine responsive to receiving the indication that the particular condition is satisfied; and
subsequent to executing the default group of actions for the routine responsive to receiving the indication that the particular condition is satisfied:
determining, by the assistant and based on receiving the indication that the particular condition is satisfied during the particular time of day, to customize the routine for the user for a particular period of time,
wherein customizing the routine for the particular period of time comprises causing an additional action to be performed during the routine when the particular condition is satisfied within the particular period of time, and
wherein the additional action is determined based on receiving the indication of the particular condition being satisfied and wherein the additional action is not included in the default group of actions, and
wherein the particular period of time corresponds to a threshold amount of time that includes the particular time of day; and
subsequent to customizing the routine for the user for the particular period of time, and during the particular period of time:
receiving, by the assistant, an additional indication that the particular condition is satisfied; and
responsive to receiving the additional indication that particular condition is satisfied during the particular period of time, executing, by the assistant, the customized routine, including executing the additional action and at least one action from the default group of actions.

8. The method of claim 7, wherein determining the default group of actions for the routine for the user comprises determining the default group of actions based at least on a frequency with which the user uses the computing device to perform one or more actions of the default group of actions.

9. The method of claim 7, wherein executing the additional action comprises controlling, by the assistant, at least one home automation device.

10. The method of claim 7, wherein the particular condition being satisfied comprises determining that a particular command was spoken and was directed to the automated assistant.

11. The method of claim 10, wherein the indication of the particular command is received from at least one home automation device.

12. The method of claim 7, wherein executing the customized routine, including executing the additional action and at least one action from the default group of actions, includes causing one or more additional computing devices associated with the user to execute the additional action and/or the at least one action from the default group of actions.

13. The method of claim 7, wherein determining, by the assistant and based on receiving the indication that the particular condition is satisfied during the particular time of day, to customize the routine for the user for the particular period of time includes:
identifying a user profile, of the user, based on processing image data and/or audio data, and
determining to customize the routine for the user for the particular period of time based on information included in the user profile of the user.

14. The method of claim 7, further comprising:
subsequent to executing the customized routine responsive to the additional indication of the satisfaction of the condition, and during the particular period of time:
receiving, by the assistant, a subsequent indication of satisfaction of the condition; and
responsive to receiving the subsequent indication of the satisfaction of the condition, again executing, by the assistant, the customized routine, including executing the additional action and the at least one action from the default group of actions.

15. The method of claim 7, further comprising:
subsequent to executing the customized routine responsive to the additional indication of the satisfaction of the condition, and during the particular period of time:
receiving, by the assistant, a subsequent indication of satisfaction of the condition; and
responsive to receiving the subsequent indication of the satisfaction of the condition, executing, by the assistant the default group of actions for the routine without the additional action.

16. A system comprising:
one or more computers and one or more storage devices storing instructions that are operable and when executed by one or more computers, cause the one or more computers to perform actions comprising:
determining, by an assistant executing at least in part on a computing device of a user, a default group of actions for a routine, for the user, that the assistant is configured to execute in response to satisfaction of a particular condition;
receiving, by the assistant, an indication that the particular condition is satisfied during a particular time of day;
executing, by the assistant, each action from the default group of actions for the routine responsive to receiving the indication that the particular condition is satisfied; and
subsequent to executing the default group of actions for the routine responsive to receiving the indication that the particular condition is satisfied:
determining, by the assistant and based on receiving the indication that the particular condition is satisfied during the particular time of day, to customize the routine for the user for a particular period of time, wherein customizing the routine for the particular period of time comprises causing an additional action to be performed during the routine when the particular condition is satisfied within the particular period of time, and wherein the additional action is determined based on receiving the indication of the particular condition being satisfied and wherein the additional action is not included in the default group of actions, and wherein the particular period of time corresponds to a threshold amount of time that includes the particular time of day; and subsequent to customizing the routine for the user for the particular period of time, and during the particular period of time:

receiving, by the assistant, an additional indication that the particular condition is satisfied; and responsive to receiving the additional indication that particular condition is satisfied during the particular period of time, executing, by the assistant, the customized routine, including executing the additional action and at least one action from the default group of actions.

17. The system of claim 16, wherein determining the default group of actions for the routine for the user comprises determining the default group of actions based at least on a frequency with which the user uses the computing device to perform one or more actions of the default group of actions.

18. The system of claim 16, wherein the indication of the particular command is received from at least one home automation device.

19. The system of claim 16, wherein executing the additional action comprises controlling, by the assistant, at least one home automation device.

* * * * *